United States Patent
Tao et al.

(10) Patent No.: US 10,909,966 B2
(45) Date of Patent: Feb. 2, 2021

(54) ACTIVE NOISE REDUCTION DEVICE AND ACTIVE NOISE REDUCTION METHOD

(71) Applicant: PANASONIC INTELLECTUAL PROPERTY MANAGEMENT CO., LTD., Osaka (JP)

(72) Inventors: Masafumi Tao, Kanagawa (JP); Tomofumi Yamanashi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 16/095,449

(22) PCT Filed: Apr. 21, 2017

(86) PCT No.: PCT/JP2017/015994
§ 371 (c)(1),
(2) Date: Oct. 22, 2018

(87) PCT Pub. No.: WO2017/188133
PCT Pub. Date: Nov. 2, 2017

(65) Prior Publication Data
US 2019/0126845 A1  May 2, 2019

(30) Foreign Application Priority Data
Apr. 27, 2016 (JP) ................. 2016-089603

(51) Int. Cl.
*G10K 11/178* (2006.01)
*B60R 11/02* (2006.01)
*B60R 13/08* (2006.01)

(52) U.S. Cl.
CPC .. *G10K 11/17823* (2018.01); *G10K 11/17854* (2018.01); *G10K 11/17883* (2018.01);
(Continued)

(58) Field of Classification Search
CPC ........... G10K 11/178; G10K 11/17854; G10K 11/17883; G10K 2210/1282; B60R 11/0264; B60R 13/0838
(Continued)

(56) References Cited

U.S. PATENT DOCUMENTS

| | | | | |
|---|---|---|---|---|
| 5,410,606 A * | 4/1995 | Imai | ..... | G10K 11/178 381/71.14 |
| 8,306,240 B2 * | 11/2012 | Pan | ..... | G10K 11/178 381/94.1 |
| 8,355,512 B2 * | 1/2013 | Pan | ..... | G10K 11/178 381/71.11 |
| 9,191,739 B2 * | 11/2015 | Ganeshkumar | ..... | G10K 11/178 |

(Continued)

FOREIGN PATENT DOCUMENTS

| | | |
|---|---|---|
| JP | H03-178846 A | 8/1991 |
| JP | H06-035483 A | 2/1994 |

(Continued)

OTHER PUBLICATIONS

International Search Report, dated Jul. 4, 2017, by the Japan Patent Office (JPO) in the corresponding International Patent Application No. PCT/JP2017/015994.

*Primary Examiner* — Davetta W Goins
*Assistant Examiner* — Daniel R Sellers
(74) *Attorney, Agent, or Firm* — Greenblum & Bernstein, P.L.C.

(57) ABSTRACT

An active noise reduction device includes a standard signal generator, adaptive filters, a control sound emitter, and an error signal detector. The standard signal generator generates a standard signal including harmonics of a fundamental frequency correlated with the control target sound. The adaptive filters each generates corresponding one of harmonic components of a control signal based on the standard signal. The adaptive filters each is for corresponding one of the harmonics. The control sound emitter emits a control sound based on the control signal. The error signal detector collects residual noise left over after interference between
(Continued)

the control target sound and the control sound, and detects an error signal based on the residual noise. Each of the adaptive filters includes a step size determiner. The step size determiner sets the step size parameter based on a frequency variation in the corresponding one of the harmonic components of the standard signal.

5 Claims, 2 Drawing Sheets

(52) U.S. Cl.
CPC ....... *B60R 11/0264* (2013.01); *B60R 13/0838* (2013.01); *G10K 2210/1282* (2013.01)

(58) Field of Classification Search
USPC .................... 381/86, 71.1–71.9, 71.11–71.14
See application file for complete search history.

(56) References Cited

U.S. PATENT DOCUMENTS

| 2006/0269078 | A1* | 11/2006 | Sakamoto | G10K 11/178 381/71.1 |
| 2008/0192948 | A1 | 8/2008 | Kan et al. | |
| 2008/0240456 | A1* | 10/2008 | Sakamoto | G10K 11/17854 381/71.4 |
| 2011/0235693 | A1* | 9/2011 | Lee | G10K 11/17854 375/224 |
| 2013/0315408 | A1* | 11/2013 | Yano | G10K 11/17881 381/66 |
| 2015/0063581 | A1* | 3/2015 | Tani | G10K 11/17821 381/71.2 |

FOREIGN PATENT DOCUMENTS

| JP | H07-230289 A | 8/1995 |
| JP | 4213640 B2 | 11/2008 |

* cited by examiner

ACTIVE NOISE REDUCTION DEVICE AND ACTIVE NOISE REDUCTION METHOD

This application is a U.S. national stage application of the PCT International Application No. PCT/JP2017/015994 filed on Apr. 21, 2017, which claims the benefit of foreign priority of Japanese patent application 2016-089603 filed on Apr. 27, 2016, the contents all of which are incorporated herein by reference.

TECHNICAL FIELD

The present invention relates to an active noise reduction device and an active noise reduction method that are used to actively reduce engine booming noise generated in a vehicle cabin along with engine vibration.

BACKGROUND ART

In recent years, active noise reduction devices for reducing engine booming noise have been put to practical use. These devices reduce engine booming noise generated in a cabin of a traveling vehicle by letting the noise and a control sound with opposite phases and the same amplitude interfere with each other. Engine booming noise is acoustic radiation generated by the resonance of a cabin of a vehicle, i.e. a closed space, under certain conditions in response to vibration transmitted from an engine through a body of the vehicle. This noise shows noticeable periodicity in synchronization with a rotation rate of the engine.

An active noise reduction device includes an adaptive filter that allows a transfer function in an engine vibration transfer line to adapt itself and thereby generates signal Y(n) for a control sound (hereinafter referred to as "control signal Y(n)") that is to be emitted to a control point. The adaptive filter includes a control signal generator to generate control signal Y(n) and a filter coefficient updating part to update filter coefficient W(n) for the control signal generator.

In the adaptive filter using a feedforward control technique, the control signal generator generates control signal Y(n) by multiplying standard signal X(n) based on an engine pulse by filter coefficient W(n), for example. A control sound correlated with control signal Y(n) is emitted to a control point. The filter coefficient updating part successively updates filter coefficient W(n) on the basis of signal E(n) correlated to residual noise remaining at the control point (a difference between a control target sound and the control sound, hereinafter referred to as "error signal E(n)") as well as reference signal R(n) so as to reduce error signal E(n). An optimization algorithm such as a least mean square (LMS) algorithm is applied to the filter coefficient updating part.

If a tap length of the adaptive filter is "1", i.e., in the case of a 1-tap adaptive filter, filter coefficient W(n+1) at time (n+1) is represented by following equation (1). In equation (1), μ is a parameter that controls an updating amount of filter coefficient W(n), i.e., a convergence rate, and is called a step size parameter. If step size parameter μ gets small, the algorithm improves in accuracy but slows in convergence rate.

$$W(n+1)=W(n)-\mu \cdot E(n) \cdot R(n) \quad (1)$$

Standard signal X(n) used in the active noise reduction device ordinarily contains high-order frequency components of a frequency associated with an engine rotation rate, e.g., revolutions per minute (rpm). The frequency is revolutions per minute [rpm]/60 (hereinafter referred to as a "fundamental frequency"). For example, the fuel mixture in a four-cylinder in-line engine explodes four times during two revolutions of the crankshaft, and hence even-numbered harmonic components, i.e., 2N-order components (N: positive integers), of a fundamental frequency are main components of standard signal X(n). In other words, standard signal X(n) contains a second-order component forming a fundamental wave, a fourth-order component, a sixth-order component, etc. that constitute harmonics. Control signal Y(n) has conventionally been generated by multiplying all the harmonic components contained in standard signal X(n) by common filter coefficient W(n).

In the case of a sudden change in engine rotation rate, the speed at updating filter coefficient W(n) may be inadequate to adapt to the sudden change and filter coefficient W(n) may diverge in the active noise reduction device described above, resulting in the generation of an unusual noise. Techniques for resolving this problem are found, for example, in PTLs 1, 2. PTL 1 discloses a technique for adapting to a sudden change in the rotation rate of an engine along with acceleration or deceleration and for effectively reducing a control target sound by setting step size parameter μ in line with the rotation rate and state of the engine. PTL 2 discloses a technique for preventing the generation of an unusual noise by stopping the emission of a control sound from an adaptive filter in the event of a sudden change in engine rotation rate.

CITATION LIST

Patent Literature

PTL 1: Unexamined Japanese Patent Publication No. H7-230289
PTL 2: Japanese Patent No. 4213640

SUMMARY OF THE INVENTION

The present invention provides an active noise reduction device and an active noise reduction method that are designed to effectively reduce a control target sound arising from engine vibration, even in the case of a sudden change in engine rotation rate, such as during acceleration or deceleration.

An active noise reduction device according to an aspect of the present invention actively reduces a control target sound. The control target sound is generated from an engine or a noise source and has periodicity. The active noise reduction device includes a standard signal generator, adaptive filters, a control sound emitter, and an error signal detector. The standard signal generator generates a standard signal including harmonics of a fundamental frequency correlated with the control target sound. The adaptive filters each generates corresponding one of harmonic components of a control signal based on the standard signal. The adaptive filters each is for corresponding one of the harmonics. The control sound emitter emits a control sound based on the control signal. The error signal detector collects residual noise left over after interference between the control target sound and the control sound, and detects an error signal based on the residual noise. Each of the adaptive filters includes a reference signal generator, a control signal generator, a filter coefficient updating part, and a step size determiner. The reference signal generator generates a reference signal based on corresponding one of harmonic components of the standard signal. The standard signal is input into the adaptive filters. The control signal generator generates corresponding one of the harmonic components of the control signal by multiplying the corresponding one of the harmonic components of the standard signal by a filter coefficient. The filter coefficient updating part updates the filter coefficient based on the reference signal and the error signal so as to minimize the error signal. The step size determiner sets a step size parameter that controls an updating amount of the filter coefficient. The step size determiner sets the step size parameter for the corresponding one of the harmonics based on a frequency variation in the corresponding one of the harmonic components of the standard signal.

An active noise reduction method according to another aspect of the present invention actively reduces a control target sound at a control point. The control target sound is generated from an engine or a noise source and has periodicity. The active noise reduction method includes step A, step B, step C, and step D. In the step A, a standard signal including harmonics of a fundamental frequency correlated with the control target sound is generated. In the step B, a control signal is generated based on the standard signal. In the step C, a control sound is emitted based on the control signal. In the step D, residual noise left over after interference between the control target sound and the control sound is collected to detect an error signal based on the residual noise. The step B includes step B1 and step B2. In the step B1, harmonic components of the control signal is generated. In the step B2, the control signal is generated by combining the harmonic components of the control signal. Generating each of the harmonic components of the control signal in the step B1 includes step B11, step B12, step B13, and step B14. In the step B11, a reference signal is generated based on corresponding one of harmonic components of the standard signal. In the step B12, corresponding one of the harmonic components of the control signal is generated by multiplying the corresponding one of the harmonic components of the standard signal by a filter coefficient. In the step B13, the filter coefficient is updated based on the reference signal and the error signal so as to minimize the error signal. In the step B14, a step size parameter that controls an updating amount of the filter coefficient is set. In the step B14, the step size parameter for corresponding one of the harmonics is set based on a frequency variation in the corresponding one of the harmonic components of the standard signal.

According to the present invention, step size parameters suitable for each harmonic component of the control target sound are set, and filter coefficients are calculated using the respective set step size parameters. This configuration ensures adaptability per each harmonic component even in the case of a sudden change in engine rotation rate, such as during acceleration or deceleration. From this, the effect of stably reducing all harmonic components (especially high-order frequency components) of a control target sound arising from engine vibration is achieved.

DESCRIPTION OF EMBODIMENT

Before an exemplary embodiment of the present invention is described, problems in a conventional technique will be briefly described. In PTL 1, step size parameter p changes in line with a variation in the engine rotation rate, i.e. a fundamental frequency. Thus, adaptability to high-order frequency components (harmonic components) may decrease in the case of a sudden change in the engine rotation rate, such as during acceleration or deceleration. For example, a description will be given of a situation in which a threshold range of variation in fundamental frequency f0 is set to 1 Hz. This means that when a range of variation in the second-order component forming a fundamental wave reaches 2 Hz or greater, step size parameter p for the frequency component changes. In this case, until a range of variation in the fourth-order component reaches 4 Hz or greater, or until a range of variation in the eighth-order component reaches 8 Hz or greater, step size parameter p for the component concerned remains unchanged. In this way, in the case of a sudden change in engine rotation rate, the effectiveness of a control sound in reducing harmonic components decreases.

The technique described in PTL 2 is useful for preventing the generation of an unusual noise due to a decline in adaptability of a control sound, but does not produce an effect on reducing a control target sound.

Figure 1:
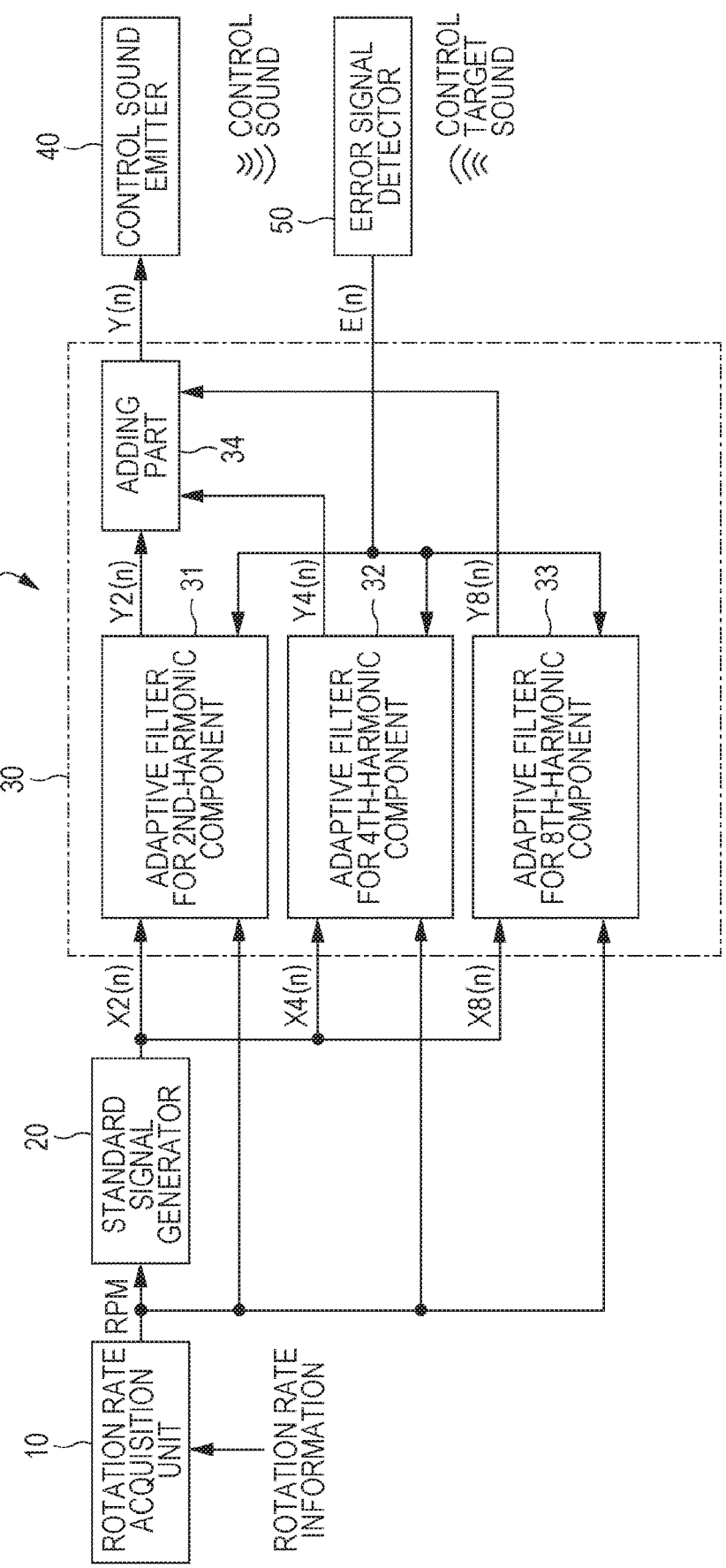
FIG. 1 is a diagram illustrating an active noise reduction device according to an exemplary embodiment.

An exemplary embodiment of the present invention will now be described in detail with reference to the drawings. FIG. 1 is a diagram illustrating active noise reduction device 1 according to the exemplary embodiment. Active noise reduction device 1 is installed in a vehicle that has an engine as a driving source. Active noise reduction device 1 reduces engine booming noise (a control target sound) generated in a cabin of the vehicle owing to vibration of the engine by letting the engine booming noise and a control sound with opposite phases and the same amplitude interfere with each other.

With reference to FIG. 1, active noise reduction device 1 includes rotation rate acquisition unit 10, standard signal generator 20, adaptive filter unit 30, control sound emitter 40, and error signal detector 50.

Rotation rate acquisition unit 10 acquires a rotation rate of an engine in accordance with an engine pulse synchronized with rotation of the engine. The engine pulse is, for example, sent from an engine rotation sensor (not shown) that detects the rotation rate of the engine. Rotation rate acquisition unit 10 transmits rotation rate information RPM about the rotation rate of the engine to standard signal generator 20 and adaptive filter unit 30.

Standard signal generator 20 calculates engine vibration frequency f0 (a fundamental frequency) based on rotation rate information RPM from rotation rate acquisition unit 10 and generates standard signal X(n) correlated to the control target sound. Standard signal X(n) includes a sine component and a cosine component, for example, and contains a plurality of harmonic components. A k-order component of standard signal X(n) is hereinafter represented as Xk(n).

A fuel mixture in a four-cylinder in-line engine explodes four times during two revolutions of a crankshaft, and hence even-numbered harmonic components, i.e., 2N-order components (N: positive integers), of fundamental frequency f0 are main components of standard signal X(n). In this example, a second-order component (a fundamental wave component) as well as a fourth-order component and an eighth-order component (harmonic components) contained in the control target sound are subject to control. In other words, standard signal generator 20 generates standard signal X(n) containing second-order component $X2(n)$, fourth-order component $X4(n)$, and eighth-order component $X8(n)$ and sends the standard signal to adaptive filter unit 30.

For example, if the rotation rate of a four-cylinder in-line engine is 2,400 rpm, fundamental frequency f0 is 40 Hz. Hence, in standard signal X(n), frequencies f2, f4, and f8 of second-order component $X2(n)$, fourth-order component X4(n), and eighth-order component X8(n) are 80 Hz, 160 Hz, and 320 Hz, respectively.

Adaptive filter unit 30 generates control signal Y(n) based on standard signal X(n). Control signal Y(n) is a signal correlated to a control sound that is used to cancel engine booming noise generated in the vehicle cabin.

Adaptive filter unit 30 includes adaptive filter 31 for second-order components, adaptive filter 32 for fourth-order components, adaptive filter 33 for eighth-order components, and adding part 34. In other words, the adaptive filters are provided for each of the harmonic components subject to control.

Adaptive filters 31 to 33 generate second-order component Y2(n), fourth-order component Y4(n), and eighth-order component Y8(n), respectively, for control signal Y(n) and output these components to adding part 34. Adaptive filters 31 to 33 are each a 1-tap adaptive filter having a tap length of "1", for example. Adaptive filter unit 30 will be detailed later.

Adding part 34 combines harmonic components Y2(n), Y4(n), and Y8(n) output from adaptive filters 31 to 33 together to generate control signal Y(n) and sends the control signal to control sound emitter 40.

Control sound emitter 40 includes a speaker disposed at a predetermined location (e.g., behind a rear seat) in the vehicle cabin. Control sound emitter 40 converts control signal Y(n) into an analog signal by a digital-to-analog (D/A) converter (not shown) and emits a control sound from the speaker. The control sound emitted from control sound emitter 40 is transmitted through a transfer line (a secondary path) having transfer characteristic C and reaches a control point. At the control point, the control sound transmitted through the secondary path interferes with the control target sound transmitted through a primary path so that the control target sound fades.

Error signal detector 50 includes a microphone disposed near the control point (e.g., a ceiling in a middle of the vehicle cabin). With the microphone, error signal detector 50 collects residual noise that has not been muffled by the control sound and sends error signal E(n) correlated to the residual noise to adaptive filter unit 30. Adaptive filter unit 30 uses error signal E(n) when updating filter coefficient W(n).

Figure 2:
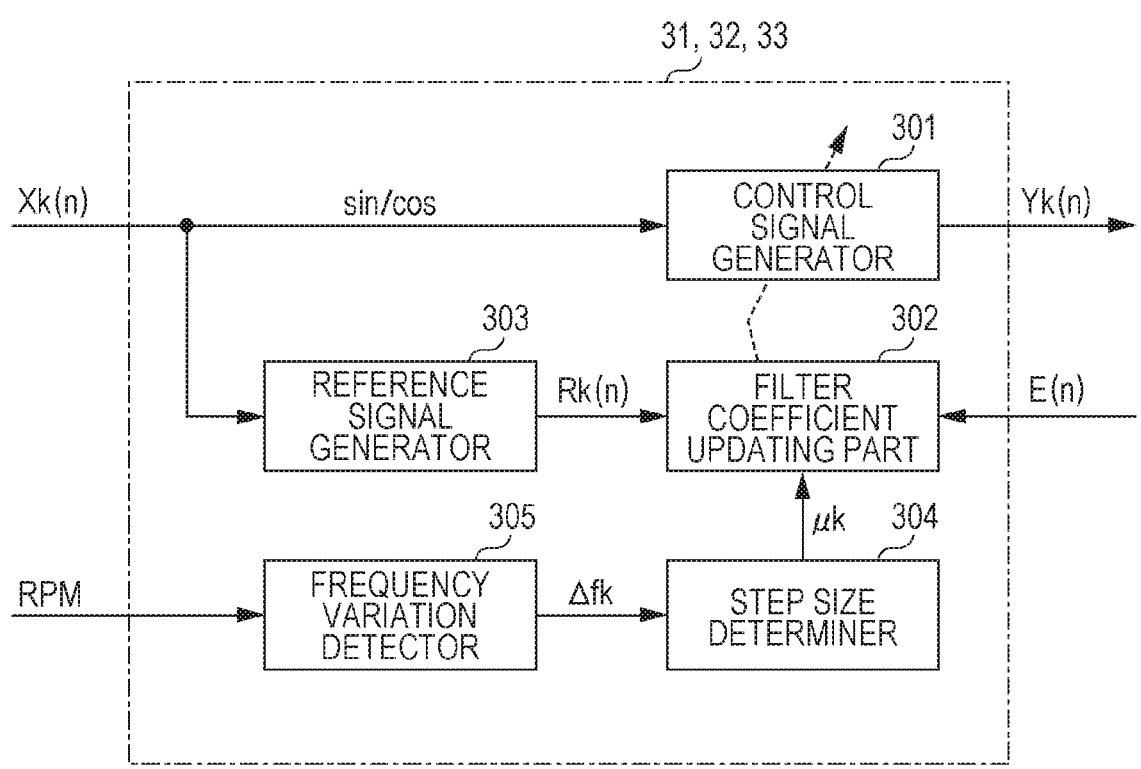
FIG. 2 is a diagram illustrating a configuration of an adaptive filter.

FIG. 2 is a diagram illustrating a configuration of adaptive filters 31 to 33. In FIG. 2, symbols affixed with "k" represent signals for k-order components. In the present exemplary embodiment, k=2, 4, and 8.

With reference to FIG. 2, adaptive filters 31 to 33 each include control signal generator 301, filter coefficient updating part 302, reference signal generator 303, step size determiner 304, and frequency variation detector 305.

Control signal generator 301 generates k-order component Yk(n) for control signal Y(n) by multiplying k-order component Xk(n) of standard signal X(n) by filter coefficient Wk(n). Filter coefficient Wk(n+1) for k-order components at time (n+1) is represented by following equation (2).

$$Wk(n+1) = Wk(n) - \mu k \cdot E(n) \cdot Rk(n) \quad (2)$$

Thus, in the present exemplary embodiment, step size parameter k is specified for each harmonic component, and filter coefficient Wk(n) is calculated. Adding part 34 combines harmonic component Yk(n) output from control signal generator 301 with other harmonic components output from the other control signal generators, and sends control signal Y(n) containing the combined components.

Filter coefficient updating part 302 successively updates filter coefficient Wk(n) based on reference signal Rk(n) and error signal E(n) so as to minimize error signal E(n). Examples of an adaptive algorithm applied to filter coefficient updating part 302 include LMS algorithms, which are a class of steepest descent methods. Filter coefficient Wk(n) approaches to an optimum value so as to recursively lessen error signal E(n), i.e., so as to reduce residual noise at the control point.

Reference signal generator 303 generates reference signal Rk(n) based on k-order component Xk(n) of standard signal X(n). Reference signal Rk(n) is, for example, a signal of corrected standard signal X(n) in accordance with transfer characteristic Ĉ (a secondary path model) imitating transfer characteristic C of the transfer line for the control sound (what is called a filtered-X LMS algorithm).

Frequency variation detector 305 detects frequency variation range Δfk of a k-order component based on rotation rate information RPM from rotation rate acquisition unit 10. Frequency variation detector 305 may detect frequency variation range Δfk in k-order component Xk(n) of standard signal X(n). Frequency variation range Δfk is sent from frequency variation detector 305 and is input into step size determiner 304.

Step size determiner 304 sets step size parameter μk that controls an updating amount of filter coefficient Wk(n). Step size determiner 304 sets step size parameter μk for k-order components based on frequency variation range Δfk in k-order component Xk(n) of standard signal X(n).

Step size determiner 304 sets step size parameter μk to an increased value in response to an increase in the frequency variation range in k-order component Xk(n) of standard signal X(n). This configuration enables step size parameter μk to have an increased value in response to a sudden change in engine rotation rate so that the speed of adapting to a change rises.

Specifically step size determiner 304 sets step size parameter μk to a value larger than a present value when the frequency variation range in k-order component Xk(n) of standard signal X(n) reaches a predetermined threshold level or greater. Further, step size determiner 304 may have a plurality of predetermined threshold levels and set step size parameter μk in a plurality of steps.

Step size determiner 304 sets step size parameter μk in accordance with Table 1, for example. In other words, in accordance with Table 1, step size parameter μk is set to twice the present value when frequency variation range Δfk in any harmonic component reaches 2 Hz or greater. This increases filter coefficient Wk(n) by 6 dB, resulting in an increase in updating amount and a rise in the speed of adapting to a change. When frequency variation range Δfk in any harmonic component reaches 4 Hz or greater, step size parameter μk is set to three times the present value. This increases filter coefficient Wk(n) by 9 dB, resulting in a further increase in updating amount and a further rise in the speed of adapting to a change.

TABLE 1

| | Slow Acceleration | | Fast Acceleration | |
|---|---|---|---|---|
| Frequency Variation Δf | Threshold Level | μk | Threshold Level | μk |
| 2nd-order Component 4th-order Component 8th-order Component | 2 Hz | 2 times | 4 Hz | 3 times |

For example, in response to a change in the rotation rate of a four-cylinder in-line engine from 2,400 rpm to 2,430 rpm, variation range $\Delta f0$ of fundamental frequency f0 reaches 0.5 Hz. Hence, frequency variation ranges $\Delta f2$, $\Delta f4$, and $\Delta f8$ in the second-order component, fourth-order component, and eighth-order component reach 1 Hz, 2 Hz, and 4 Hz, respectively. In accordance with Table 1, the present value of step size parameter μ2 for second-order components remains unchanged, the present value of step size parameter μ4 for fourth-order components is doubled, and the present value of step size parameter μ8 for eighth-order components is tripled. This configuration ensures adaptability since filter coefficient Wk(n) is calculated using step size parameter μk set for each of the harmonic components.

In Table 1, threshold levels for determining whether or not to change step size parameter μk are values common to all the harmonic components.

However, different threshold levels may be set for each of the harmonic components.

As described above, active noise reduction device 1 according to the exemplary embodiment actively reduces a control target sound at a control point. The control target sound is generated from an engine or a noise source and has periodicity. The active noise reduction device 1 includes a standard signal generator 20, adaptive filters 30, a control sound emitter 40, and an error signal detector 50. The standard signal generator 20 generates a standard signal X(n) including harmonics of a fundamental frequency correlated with the control target sound. The adaptive filters 30 each generates corresponding one of harmonic components of a control signal Y(n) based on the standard signal X(n). The adaptive filters 30 each is for corresponding one of the harmonics. The control sound emitter 40 emits a control sound based on the control signal Y(n). The error signal detector 50 collects residual noise left over after interference between the control target sound and the control sound, and detects an error signal E(n) based on the residual noise. Each (31 to 33) of the adaptive filters 30 includes a reference signal generator 303, a control signal generator 301, a filter coefficient updating part 302, and a step size determiner 304. The reference signal generator 303 generates a reference signal Rk(n) based on corresponding one of harmonic components Xk(n) of the standard signal X(n). The standard signal X(n) is input into the adaptive filters. The control signal generator 301 generates corresponding one of the harmonic components Yk(n) of the control signal Y(n) by multiplying the corresponding one of the harmonic components Xk(n) of the standard signal X(n) by a filter coefficient Wk(n). The filter coefficient updating part 302 updates the filter coefficient Wk(n) based on the reference signal Rk(n) and the error signal E(n) so as to minimize the error signal E(n). The step size determiner 304 sets a step size parameter k that controls an updating amount of the filter coefficient Wk(n). The step size determiner 304 sets the step size parameter μk for the corresponding one of the harmonics based on a frequency variation $\Delta fk$ in the corresponding one of the harmonic components Xk(n) of the standard signal X(n).

An active noise reduction method according to the exemplary embodiment, actively reduces a control target sound at a control point. The control target sound is generated from an engine or a noise source and has periodicity. The active noise reduction method includes step A, step B, step C, and step D. In the step A, a standard signal X(n) including harmonics of a fundamental frequency correlated with the control target sound is generated. In the step B, a control signal Y(n) is generated based on the standard signal X(n). In the step C, a control sound is emitted based on the control signal Y(n). In the step D, residual noise left over after interference between the control target sound and the control sound is collected to detect an error signal E(n) based on the residual noise. The step B includes step B1 and step B2. In the step B1, harmonic components Yk(n) of the control signal Y(n) is generated. In the step B2, the control signal Y(n) is generated by combining the harmonic components Yk(n) of the control signal. Generating each of the harmonic components Yk(n) of the control signal Y(n) in the step B1 includes step B11, step B12, step B13, and step B14. In the step B11, a reference signal Rk(n) is generated based on corresponding one of harmonic components Xk(n) of the standard signal X(n). In the step B12, corresponding one of the harmonic components Yk(n) of the control signal Y(n) is generated by multiplying the corresponding one of the harmonic components Xk(n) of the standard signal X(n) by a filter coefficient Wk(n). In the step B13, the filter coefficient Wk(n) is updated based on the reference signal Rk(n) and the error signal R(n) so as to minimize the error signal R(n). In the step B14, a step size parameter k that controls an updating amount of the filter coefficient Wk(n) is set. In the step B14, the step size parameter k for corresponding one of the harmonics is set based on a frequency variation $\Delta fk$ in the corresponding one of the harmonic components Xk(n) of the standard signal X(n).

In active noise reduction device 1 and the active noise reduction method according to the exemplary embodiment, step size parameter μk is set suitably for components of the control target sound in each of the harmonic components, and filter coefficient Wk(n) is calculated using set step size parameter k. This configuration ensures adaptability to each of the harmonic components even in the case of a sudden change in engine rotation rate, such as during acceleration or deceleration. This makes it possible to achieve the effect of stably reducing all the harmonic components (especially high-order frequency components) of a control target sound arising from engine vibration.

Although the present invention has been specifically described above on the basis of the exemplary embodiment, the scope of the present invention should not be limited to the above exemplary embodiment, and should include various modifications without departing from the spirit of the present invention.

In the exemplary embodiment, frequency variation range $\Delta fk$ in each of the harmonic components is calculated, and whether or not to change step size parameter μk is determined by comparing frequency variation range $\Delta fk$ with threshold levels. However, this determination may be made based on rotation rate variation $\Delta RPM$, for example. In this case, as shown in Table 2, the threshold levels for the frequency variation range in Table 1 are converted into threshold levels for the rotation rate. In addition, frequency variation detector 305 in FIG. 2 can be omitted. In this modification, engine rotation rates are merely used as threshold levels. This is nothing but the setting of step size parameter μk based on frequency variation in each of the harmonic components.

TABLE 2

| Rotation Rate | Slow Acceleration | | Fast Acceleration | |
|---|---|---|---|---|
| Variation $\Delta RPM$ | Threshold Level | μk | Threshold Level | μk |
| 2nd-order Component | 60 rpm | 2 times | 120 rpm | 3 times |

TABLE 2-continued

| Rotation Rate | Slow Acceleration | | Fast Acceleration | |
|---|---|---|---|---|
| Variation ΔRPM | Threshold Level | μk | Threshold Level | μk |
| 4th-order Component | 30 rpm | | 60 rpm | |
| 8th-order Component | 15 rpm | | 30 rpm | |

A step size change coefficient (a constant of proportionality) may be set to seamlessly calculate step size parameter k for a frequency variation range, for example.

Adaptive filter unit 30 may further include a stabilizer to stabilize error signal E(n). The stabilizer generates, for example, a signal of corrected control signal Y(n) in accordance with transfer characteristic C^ (a secondary path model) imitating transfer characteristic C of a transfer line for the control sound and combines the corrected signal with error signal E(n). This configuration provides improved stability even if noise at a control point contains a noise component due to an external factor other than a control target sound.

Adaptive filter unit 30 may include a second filter coefficient updating part in addition to filter coefficient updating part 302 to update a filter coefficient based on standard signal X(n) and control signal Y(n).

It should be construed that the exemplary embodiment disclosed herein is illustrative in all aspects, and is not restrictive. The scope of the present invention is represented by the scope of the claims and not by the above description, and it is intended that all modifications within the sense and scope equivalent to the claims are involved in the scope of the present invention.

INDUSTRIAL APPLICABILITY

The present invention is suitable for an active noise reduction device and an active noise reduction method that are used to actively reduce engine booming noise generated in a vehicle cabin along with engine vibration.

REFERENCE MARKS IN THE DRAWINGS

1: active noise reduction device
10: rotation rate acquisition unit
20: standard signal generator
30: adaptive filter unit
31, 32, 33: adaptive filter for respective harmonic components
34: adding part
40: control sound emitter
50: error signal detector
301: control signal generator
302: filter coefficient updating part
303: reference signal generator
304: step size determiner
305: frequency variation detector

The invention claimed is:

1. An active noise reduction device configured to actively reduce a control target sound, the control target sound being generated from an engine or a noise source and having periodicity, the active noise reduction device comprising:

a standard signal generator configured to generate a standard signal including a plurality of harmonics of a fundamental frequency correlated with the control target sound;

a plurality of adaptive filters each configured to generate corresponding one of a plurality of harmonic components of a control signal based on the standard signal, the plurality of adaptive filters each being for corresponding one of the plurality of harmonics;

a control sound emitter configured to emit a control sound based on the control signal; and an error signal detector configured to collect residual noise left over after interference between the control target sound and the control sound and to detect an error signal based on the residual noise, wherein each of the plurality of adaptive filters includes
a reference signal generator configured to generate a reference signal based on corresponding one of a plurality of harmonic components of the standard signal, the standard signal being input into the plurality of adaptive filters;
a control signal generator configured to generate corresponding one of the plurality of harmonic components of the control signal by multiplying the corresponding one of the plurality of harmonic components of the standard signal by a filter coefficient;
a filter coefficient updating part configured to update the filter coefficient based on the reference signal and the error signal so as to minimize the error signal; and
a step size determiner configured to set a step size parameter that controls an updating amount of the filter coefficient, the step size determiner sets the step size parameter for the corresponding one of the plurality of harmonics based on a range of a frequency variation in the corresponding one of the plurality of harmonic components of the standard signal, and the range of the frequency variation increases as an order of the corresponding one of the plurality of harmonic components becomes higher.

2. The active noise reduction device according to claim 1, wherein the step size determiner sets the step size parameter for the corresponding one of the plurality of harmonic components to an increased value in response to an increase in a range of the frequency variation in the corresponding one of the plurality of harmonic components of the standard signal.

3. The active noise reduction device according to claim 1, wherein the step size determiner sets the step size parameter for the corresponding one of the plurality of harmonic components to a value larger than a present value when a range of the frequency variation in the corresponding one of the plurality of harmonic components of the standard signal reaches at least one threshold level or greater level.

4. The active noise reduction device according to claim 3, wherein the at least one threshold level includes a plurality of threshold levels, and the step size determiner sets the step size parameter for the corresponding one of the plurality of harmonic components in a plurality of steps corresponding to the plurality of threshold levels.

5. An active noise reduction method of actively reducing a control target sound, the control target sound being generated from an engine or a noise source and having periodicity, the active noise reduction method comprising:

(A) generating a standard signal including a plurality of harmonics of a fundamental frequency correlated with the control target sound;
(B) generating a control signal based on the standard signal;
(C) emitting a control sound based on the control signal; and
(D) collecting residual noise left over after interference between the control target sound and the control sound to detect an error signal based on the residual noise, wherein (B) includes
(B1) generating a plurality of harmonic components of the control signal; and
(B2) generating the control signal by combining the plurality of harmonic components of the control signal, wherein generating each of the plurality of harmonic components of the control signal in (B1) includes (B11) generating a reference signal based on corresponding one of a plurality of harmonic components of the standard signal;
(B12) generating corresponding one of the plurality of harmonic components of the control signal by multiplying the corresponding one of the plurality of harmonic components of the standard signal by a filter coefficient;
(B13) updating the filter coefficient based on the reference signal and the error signal so as to minimize the error signal; and
(B14) setting a step size parameter that controls an updating amount of the filter coefficient, and the step size parameter for corresponding one of the plurality of harmonics is set based on a range of a frequency variation in the corresponding one of the plurality of harmonic components of the standard signal, wherein the range of the frequency variation increases as an order of the corresponding one of the plurality of harmonic components becomes higher.

* * * * *